US008247521B2

(12) United States Patent
Chochos et al.

(10) Patent No.: US 8,247,521 B2
(45) Date of Patent: Aug. 21, 2012

(54) ACID-DOPED POLYELECTROLYTE MODIFIED CARBON NANOTUBES AND THEIR USE IN HIGH TEMPERATURE PEM FUEL CELL ELECTRODES

(75) Inventors: Christos Chochos, Patras (GR); Nora Gourdoupi, Patras (GR); Nikolas Triantafyllopoulos, Patras (GR); Joannis Kallitsis, Patras (GR)

(73) Assignee: Advent Technologies (GR)

( * ) Notice: Subject to any disclaimer, the term of this patent is extended or adjusted under 35 U.S.C. 154(b) by 1057 days.

(21) Appl. No.: 12/145,598

(22) Filed: Jun. 25, 2008

(65) Prior Publication Data
US 2009/0081487 A1 Mar. 26, 2009

Related U.S. Application Data

(60) Provisional application No. 60/937,307, filed on Jun. 27, 2007.

(51) Int. Cl.
*C08G 63/00* (2006.01)
*C08G 63/02* (2006.01)

(52) U.S. Cl. ........ 528/208; 429/480; 429/483; 429/494; 528/86; 528/210

(58) Field of Classification Search .................. 429/480, 429/483, 494; 528/86, 208, 210
See application file for complete search history.

(56) References Cited

U.S. PATENT DOCUMENTS

| | | | | |
|---|---|---|---|---|
| 5,770,033 A | * | 6/1998 | Murphy et al. | 205/464 |
| 6,949,308 B2 | * | 9/2005 | Gascoyne et al. | 429/481 |
| 7,338,732 B1 | * | 3/2008 | Cooper et al. | 429/483 |
| 2004/0197638 A1 | | 10/2004 | McElrath | |

OTHER PUBLICATIONS

Jang, W. et al: "Acid-base polyimide blends for the application as electrolyte membranes for fuel cells" Journal of Membrane Science, Elsevier Scientific Publ. Company, Amsterdam, NL vol. 280, No. 1-2, Sep. 1, 2006, pp. 321-329, XP024931968 ISSN: 0376-7388.
Daletou, M. K. et al: "Proton conducting membranes based on blends of PBI with aromatic polyethers containing pyridine units" Journal of Membrane Science, Elsevier Scientific Publ. Company, Amsterdam, NL vol. 252, No. 1-2, Jan. 1, 2003, pp. 115-122, XP009103762 ISSN: 0376-7388.
Pefkianakis, Elefterios K. et al: "Novel polymer electrolyte membrane, based on pyridine containing poly (ether sulfone), for application in high-temperature fuel cells." Macromolecular: Rapid Communications, Wiley VCH Verlag, Weinheim, DE vol. 26, No. 21, Jan. 1, 2005, pp. 1724-1728, XP002495312 ISSN: 1022-1336.
Gourdoupi, N. et al: "Novel Proton-Conducting Polyelectrolyte Composed of an Aromatic Polyether Containing Main-Chain Pyridine Units for Fuel Cell Applications." Chemistry of Materials, American Chemical Society, Washington, US vol. 15, No. 26, Jan. 1, 2003, pp. 5044-5050, XP009103778 ISSN: 0897-4756.
Kong, H. et al: "Polyelectrolyte-functionalizsed multiwalled carbon nanotubes: preparation, characterization and layer-by-layer self-assembly." Polymer, Elsevier Science Publishers B.V., GB vol. 46, No. 8, 24 Mar. 2005, pp. 2472-2485, XP004780973 ISSN: 0032-3861.
ISR and written opinion of International Searching Authority on PCT/IB2008/003881 issued on Jan. 14, 2010.

* cited by examiner

*Primary Examiner* — Terressa Boykin
(74) *Attorney, Agent, or Firm* — Saul Ewing LLP

(57) ABSTRACT

New multifunctional aromatic copolymers bearing pyridine or pyrimidine units either in the main chain or side chain and single wall carbon nanotubes or multi wall carbon nanotubes as side chain pendants have been prepared. These multifunctional materials will combine both high proton and electrical conductivity due to the existence of polar pyridine or pyrimidine groups and carbon nanotubes within the same chemical structure. The prepared multifunctional materials can be used in the catalyst ink of the electrodes in high temperature PEM fuel cells.

14 Claims, No Drawings

ACID-DOPED POLYELECTROLYTE MODIFIED CARBON NANOTUBES AND THEIR USE IN HIGH TEMPERATURE PEM FUEL CELL ELECTRODES

FIELD OF INVENTION

This invention is related to the development of new aromatic copolymers bearing pyridine or pyrimidine units either in the main chain or side chain and single wall carbon nanotubes or multi wall carbon nanotubes as side chain pendants. Moreover, the tethering of carbon nanotubes into a polymer backbone will enhance the dispersibility of the carbon nanotubes in liquid media. These multifunctional materials will combine the high ionic conductivity due to the polar pyridine groups which enable high acid uptake with the relatively high electrical conductivity of the carbon nanotubes. The combination of the above mentioned properties confirm the potential of the new prepared multifunctional materials to be dispersed in the catalyst ink of the electrodes in high temperature PEM fuel cells.

BACKGROUND INFORMATION

Proton exchange membrane fuel cells (PEMFC) have attracted considerable attention as promising power generators for automotive, stationary, as well as portable power, due to their high-energy efficiency and low emissions. The membrane electrode assembly is one of the key components in the design of improved PEM fuel cells.

Prior art related to methods of making membrane electrode assemblies covers issues in the following areas: (i) direct membrane catalyzation, (ii) catalyzation of coated electrode substrates, (iii) need for effecting membrane electrode bonding for seamless proton transport (iv) effective solubility of reactant gases (in particular oxygen), (v) use of pore forming agents for effective gas transport within the electrode structure. Prior art literature relates to the specific objective of enhancing mass transport and the ability to operate a fuel cell on a sustained higher power density level.

In the context of prior art, direct catalyzation of the membrane has been described in various patents and scientific literature primarily on aqueous based polymer electrolytes, most notably of the perfluorinated sulfonic acid type. At the current state of the technology, prior efforts together with current approaches have to be tempered with the ability to translate developments in this regard to mass manufacturability while keeping reproducibility (batch vs. continuous) and cost in perspective. Depending on the deposition methods used, the approach towards lowering noble metal loading can be classified into five broad categories, (i) thin film formation with carbon supported electrocatalysts, (ii) pulse electrodeposition of noble metals (Pt and Pt alloys), (iii) sputter deposition (iv) pulse laser deposition, and (v) ion-beam deposition. While the principal aim in all these efforts is to improve the charge transfer efficiency at the interface, it is important to note that while some of these approaches provide for a better interfacial contact allowing for efficient movement of ions, electrons and dissolved reactants in the reaction zone, others additionally effect modification of the electrocatalyst surface (such as those rendered via sputtering, electrodeposition or other deposition methods).

In the first of the five broad categories using the 'thin film' approach in conjunction with conventional carbon supported electrocatalysts, several variations have been reported, including (a) the so called 'decal' approach where the electrocatalyst layer is cast on a PTFE blank and then decaled on to the membrane (Wilson and Gottesfeld 1992; Chun, Kim et al. 1998). Alternatively an 'ink' comprising of Nafion® solution, water, glycerol and electrocatalyst is coated directly on to the membrane (in the $Na^+$ form) (Wilson and Gottesfeld 1992). These catalyst coated membranes are subsequently dried (under vacuum, 160° C.) and ion exchanged to the $H^+$ form (Wilson and Gottesfeld 1992). Modifications to this approach have been reported with variations to choice of solvents and heat treatment (Qi and Kaufman 2003; Xiong and Manthiram 2005) as well as choice of carbon supports with different microstructure (Uchida, Fukuoka et al. 1998). Other variations to the 'thin film' approach have also been reported such as those using variations in ionomer blends (Figueroa 2005), ink formulations (Yamafuku, Totsuka et al. 2004), spraying techniques (Mosdale, Wakizoe et al. 1994; Kumar and Parthasarathy 1998), pore forming agents (Shao, Yi et al. 2000), and various ion exchange processes (Tsumura, Hitomi et al. 2003). At its core this approach relies on extending the reaction zone further into the electrode structure away from the membrane, thereby providing for a more three dimensional zone for charge transfer. Most of the variations reported above thereby enable improved transport of ions, electrons and dissolved reactant and products in this 'reaction layer' motivated by need to improve electrocatalyst utilization. These attempts in conjunction with use of Pt alloy electrocatalysts have formed the bulk of the current state of the art in the PEM fuel cell technology. Among the limitations of this approach are problems with controlling the Pt particle size (with loading on carbon in excess of 40%), uniformity of deposition in large scale production and cost (due to several complex processes and/or steps involved).

The use of carbon nanotubes (CNTs) in electrodes for membrane electrode assemblies (MEA) has recently gained much attention (Baughman 2002). Prior art relates to the use of CNT as carbon support for the catalyst particle. CNT can replace carbon Vulcan as catalyst support. At present, all pre-commercial fuel cells use supported Pt and Pt alloys as their electrocatalysts. The critical properties to consider when choosing an electrocatalyst support include its electrical conductivity, surface area, macro-morphology, microstructure, corrosion resistance, and cost. Carbon black (CB), such as Vulcan XC-72, has been the most widely used electrocatalyst support because of its reasonable balance among electronic conductivity, surface area and cost. Recently, many nanostructured carbon materials with graphitic structure, such as nanotubes (CNTs), nanofibers (CNF) nanocoils, nanoarrays and nanoporous hollow spheres, have been studied. Among them, CNTs are of particular interest due to their unique electronic and micro and macro structural characteristics. CNTs have also been shown to be more corrosion-resistant than CB under simulated fuel cell operation conditions.

There are two categories of carbon nanotubes: single-walled nanotubes (SWNTs) and multi-walled nanotubes (MWNTs). A SWNT is a graphene sheet rolled into a cylinder. A MWNT is comprised of several coaxially arranged graphene sheets rolled into a cylinder. According to theoretical predictions, SWNTs can be either metallic or semiconducting depending on the tube diameter and helicity. The band gap is proportional to the reciprocal diameter, $1/d$. For MWNTs, scanning tunneling spectroscopy (STS) measurements indicate that the conduction is mainly due to the outer shell, which are usually much larger than SWNTs. Therefore, MWNTs have a relatively high electrical conductivity, that's why it is preferred MWNTs to be the support for the platinum catalyst in PEMFCs because of their relatively high electrical conductivity because current growth methods for MWNTs are simpler than those for SWNTs. Apart from the replacement of carbon Vulcan as catalyst support from CNT, CNT can be added into the catalyst ink of the electrode. Prior art relates to the inclusion of CNT in catalyst ink proving that CNTs generally act as paths for electron conduction and efficient gas communication (Schulte 2006). However, one of the main problems encountered with the addition of CNT in a media (i.e. catalyst ink), is their dispersion.

It thus would be desirable to provide a method for improving the low dispersibility on liquid media of the CNTs in the catalyst ink. This could be done by tethering the CNT into a polymer backbone. At the same time this polymer backbone could act as proton conductor bearing polar sites in the main chain. So, the insertion of a multifunctional component into the catalyst ink that could provide pathways for protons and electrons in the vicinity of the catalyst's sites would enhance the kinetics of electrode reactions resulting in higher catalytic activity. This could also result in lower Pt loading, in the range of 0.01 to 0.5 mg/cm$^2$, as compared to the current state of the art, thus providing for a better gravimetric energy density. It would be particularly desirable from the perspective of long term sustained power density as well as better tolerance to both load and thermal cycling (especially transitions to below the condensation zone).

SUMMARY OF THE INVENTION

The present invention relates to the development of new multifunctional pyridine or pyrimidine containing aromatic copolymers modified with single or multi wall carbon nanotubes. These multifunctional materials will combine the high ionic conductivity due to the polar pyridine or pyrimidine groups which enable high acid uptake with the relatively high electrical conductivity of the carbon nanotubes. The combination of the above mentioned properties confirm the potential of the new prepared multifunctional materials to be inserted in the catalyst ink of the electrodes in high temperature PEM fuel cells.

DETAILED DESCRIPTION OF THE INVENTION

The present invention relates to the development of new multifunctional polymeric materials (structures 1 and 2) comprising copolymers and homopolymers bearing main or side chain pyridine or pyrimidine with multi wall or single wall carbon nanotubes. The structures of the materials are given below.

structure 1

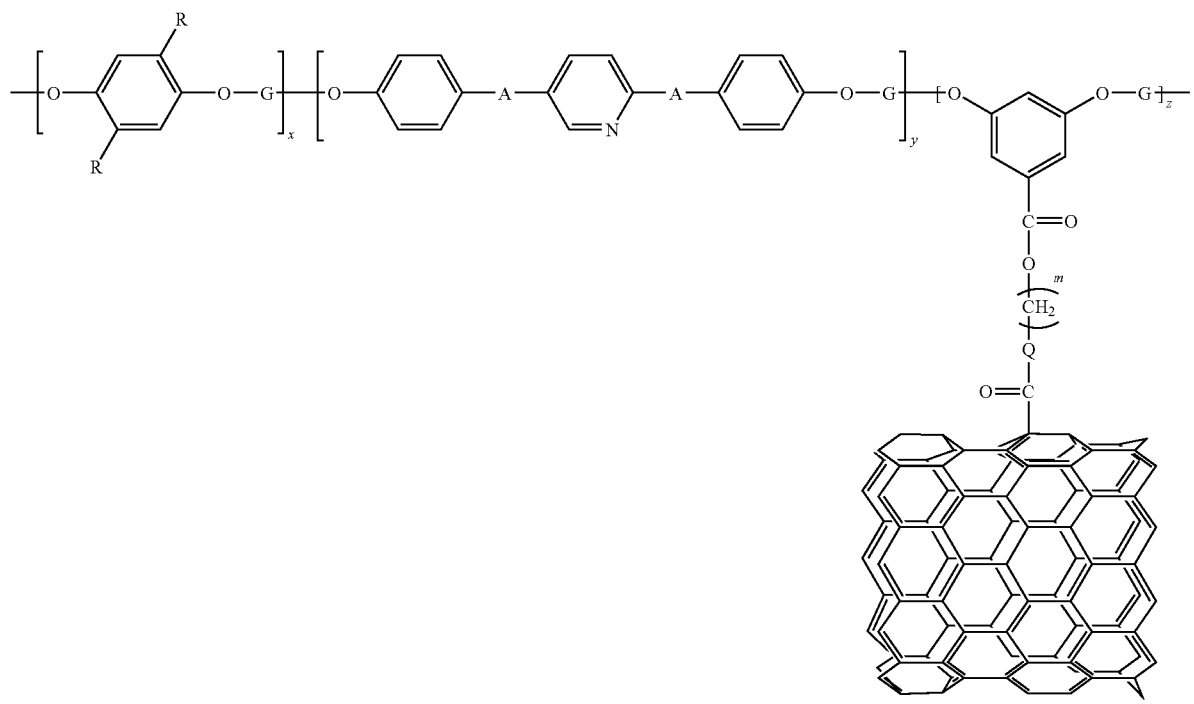

wherein R is selected from the group consisting of:

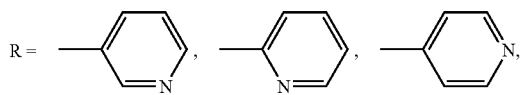

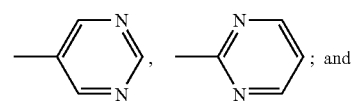

G can be the same or different and is selected from the group consisting of:

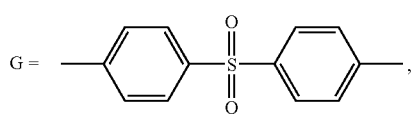

-continued
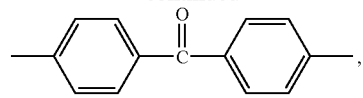
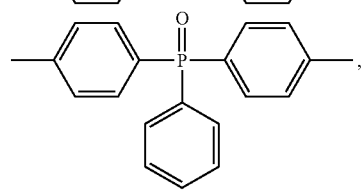
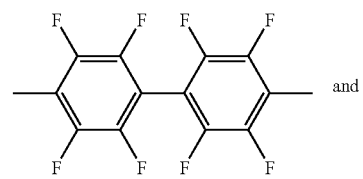 and
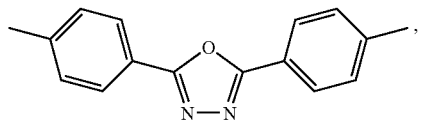
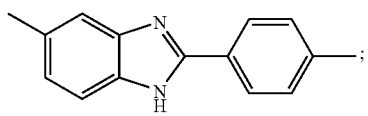
A is selected from the group consisting of:
A=—CH$_2$, —CF$_2$, -phenyl, none; or a salt thereof; and
Q is NH or O; m is a number between 1 to 18; and z is a number between 0.01 to 0.25.
wherein
G can be the same or different and is selected from the group consisting of:
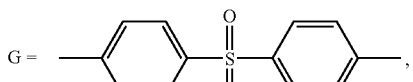
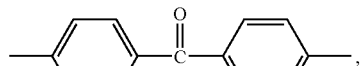
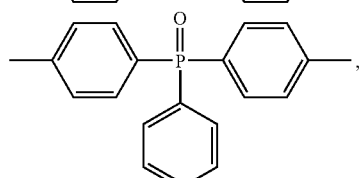
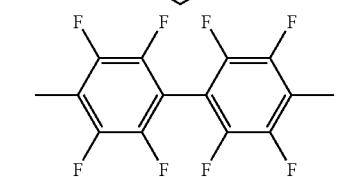
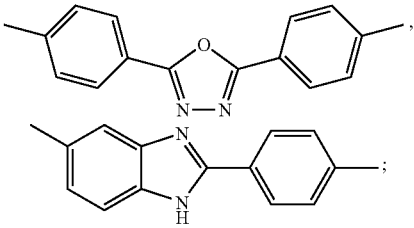
and
structure 2
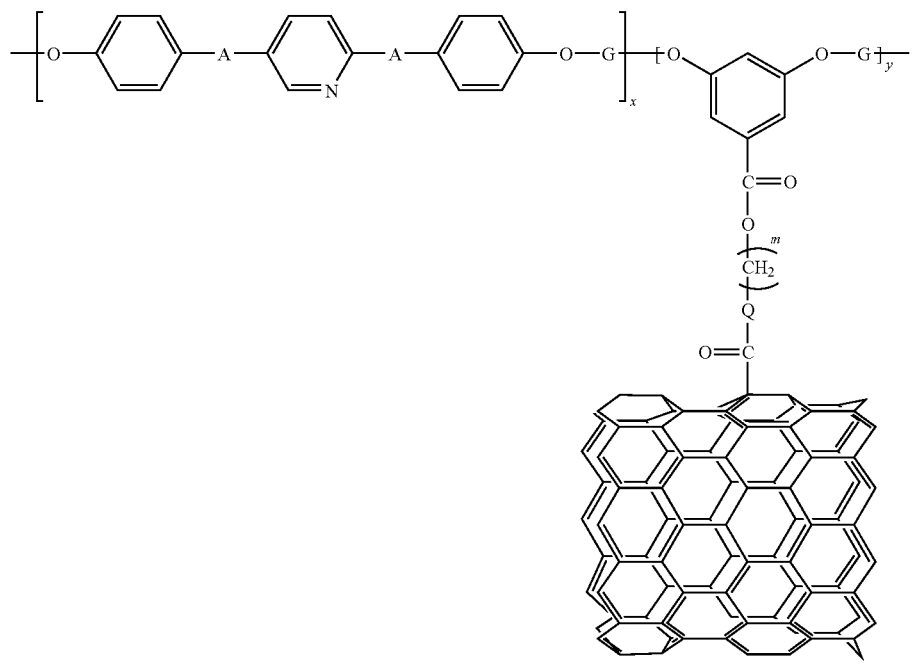

A is selected from the group consisting of:
A=—CH$_2$, —CF$_2$, -phenyl, none; or a salt thereof; and
Q is NH or O; m is a number between 1 to 18; and y is a number between 0.01 to 0.25.

The above multifunctional material (structures 1-2) were prepared via high temperature polycondensation reaction of pyridine or pyrimidine containing diols, single wall or multi wall carbon nanotubes modified diols and various aromatic difluorides.

The present invention relates to a method for implementing membrane electrode assemblies using the new multifunctional materials as described herein. The method for implementing of membrane electrode assembly includes (a) a gas diffusion and current collecting electrode component, (b) a reaction layer component comprising of a catalyst and a multifunction material which can act as paths for electron and proton conduction (structures 1-2) and (c) Pt alloy electrocatalysts for enhanced CO tolerance and oxygen reduction reaction activity.

The Gas Diffusion Electrode Component

The electrically conducting substrate is selected from a combination of woven carbon cloth (such as Toray fiber T-300) or paper (such as the Toray TGP-H-120), previously wet-proofed using TFE based solutions (DuPont, USA). The typical porosity of this carbon substrate is between 75-85%. The wet proofing is achieved with a combination of dip coating for fixed duration (between 30 sec to 5 min) followed with drying in flowing air. Such a wet proofed substrate can be coated with a gas diffusion layer comprising of select carbon blacks and PTFE suspension. The choice of carbon blacks used in this layer range from Ketjen black to turbostratic carbons such as Vulcan XC-72 (Cabot Corp, USA) with typical surface areas in the range of 250 to 1000 m$^2$/gm. The deposition can be applied with a coating machine such as Gravure coaters from Euclid coating systems (Bay City, Mich., USA). A slurry composition comprising of carbon black and PTFE (poly tetrafluoro ethylene) in aqueous suspension (such as Dupont TFE-30, Dupont USA) is applied to a set thickness over the carbon paper or cloth substrate with the aid of the coating machine. Typical thickness of 50-500 microns is used. Pore forming agents are used to prepare this diffusion layer on the carbon conducting paper or cloth substrate. Careful control of the pore formers which consist of various combinations of carbonates and bicarbonates (such as ammonium and sodium analogs) affords control of gas access to the reaction zone. This is achieved by incorporation of these agents in the slurry mixture comprising of carbon black and PTFE suspension. Typical porosity rendered in this fashion differs from anode and cathode electrode and is in the range of 10-90%. Coated carbon substrates containing the gas diffusion layers are sintered to enable proper binding of components. This can be achieved using thermal treatment to temperatures significantly above the glass transition point for PTFE, usually in the range 100 to 350° C. for 5 to 30 minutes.

Formation of Reaction Layer Comprising of Electrocatalyst and Ion Conducting Components On the surface of the above mentioned gas diffusion layer, an additional layer comprising of a carbon supported catalyst, multifunction conducting elements (structure 1-2), pore forming agents, is added using a variety of methods comprising of spraying, calendaring and or screen printing.

Typical steps first include appropriate choice of the electrocatalyst based on anode or cathode electrodes. For the anode, pure Pt or Pt in conjunction of another transition metal such as Ru, Mo, Sn is used. This is motivated by the formation of oxides on these non noble transition metals at lower potentials to enable oxidation of CO or other C$_1$ moieties which are typical poisons in the output feed of fuel reformers (steam reformation of natural gas, methanol, etc.). The choice of electrocatalyst included Pt and second transition element either alloyed or in the form of mixed oxides. The choice is dependent on the application based on choice of fuel feedstock. The electrocatalysts are in the form of nanostructured metal alloys or mixed oxide dispersions on carbon blacks (turbostratic carbon support materials usually Ketjen black or similar material).

For the cathode, electrocatalysts which are relatively immune from anion adsorption and oxide formation are preferred. The choice of the alloying element ranges between available first row transition elements, typically Ni, Co, Cr, Mn, Fe, V, Ti, etc. Previous studies have shown that adequate alloying of these transition elements with Pt results in deactivation of Pt for most surface processes (lowering of surface workfunction) (Mukerjee and Urian 2002; Teliska, Murthi et al. 2003; Murthi, Urian et al. 2004; Teliska, Murthi et al. 2005). This renders the surface largely bare for molecular oxygen adsorption and subsequent reduction. The electrocatalyst can be obtained from commercial vendors such as Columbian Chemicals (Marrietta, Ga., USA), Cabot Superior Micro-powders (Albuquerque, N. Mex., USA). The typical weight ratio of the catalyst on carbon support being 30-60% of metal on carbon.

Second step involves preparation of slurry using a combination of electrocatalyst in a suspension containing solubilized form of the multifunction material (structures 1-2). Additionally, pore forming components based on a combination of carbonates and bicarbonates are added in a ratio of 5-10% by weight. The ratio of the components has a variation of 10-30% within choice of each component enabling a total catalyst loading 0.01 to 0.5 mg of Pt or Pt alloy/cm$^2$. The application of the slurry is achieved via a combination or exclusive application of calendaring, screen printing or spraying.

Catalyst application so achieved in the form of a reaction layer is followed by third step which comprises of sintering and drying of electrode layer. In this step the electrodes are subjected to a two step process which initially involves drying at 160° C. for about 30 minutes followed by sintering at temperatures in the range of 150-350° C. for a time period in the range of 30 minutes to 5 hours.

Formation of Membrane Electrode Assembly

To prepare membrane electrode assemblies (MEAs), a sandwich of anode membrane and cathode electrodes is placed in an appropriate arrangement of gasket materials, typically a combination of polyimide and polytetrafluoroethylene (PTFE, Dupont, USA). This is followed by hot pressing with a hydraulic press or other similar device. Pressures in the range of 0.1 to 10 bars are applied with platen temperatures in the range of 150 to 250° C. for time periods typically in the range of 10 to 60 minutes. The prepared membrane electrode assemblies have thickness in the range of 75 to 250 micro meters. This allows for a final assembly of the membrane electrode assembly. The polymer electrolyte that is used for the preparation of these MEAs is selected from the US Patents applications 20060909151049, 20060909152523, 20060909154641 and 20060912150631.

REFERENCES

Baughman, R. H., A. A. Zakhidov, et. al. (2002). "Carbon nanotubes—the route toward applications." *Science* 297: 787-792.

Chun, Y. G., C. S. Kim, et al. (1998). *J. Power Sources* 71: 174.

Figueroa, J. C. (2005). Fabrication and use of electrodes and other fuel cell components having ultra low catalyst loadings coated thereon. WO Pat., (E.I. Dupont de Nemours and Company, USA). 24 pp.

Kumar, G. S. and S. Parthasarathy (1998). A method of manufacture of high performance fuel cell electrodes with very low platinum loading. IN Pat., (India). 13 PP.

Mosdale, R., M. Wakizoe, et al. (1994). "Fabrication of electrodes for proton exchange-membrane fuel cells (PEMFCs) by spraying method and their performance evaluation." *Proc.-Electrochem. Soc.* 94-23 (Electrode Materials and Processes for Energy Conversion and Storage): 179-89.

Mukerjee, S. and R. C. Urian (2002). "Bifunctionality in Pt alloy nanocluster electrocatalysts for enhanced methanol oxidation and CO tolerance in PEM fuel Cells: electrochemical and in situ synchrotron spectroscopy." *Electrochim. Acta* 47: 3219-3231.

Murthi, V. S., R. C. Urian, et al. (2004). "Oxygen Reduction Kinetics in Low and Medium Temperature Acid Environment: Correlation of Water Activation and Surface Properties in Supported Pt and Pt Alloy Electrocatalysts." *J. Phys. Chem. B* 108(30): 11011-11023.

Qi, Z. and A. Kaufman (2003). "Low Pt loading high performance cathodes for PEM fuel cells." *J. Power Sources* 113(1): 37-43.

Schulte, K., K. Prehn, et. al. (2006). "Application of carbon nanotube/polymer composites as electrode for polyelectrolyte membrane fuel cells." *Materials Research Society Symposium Proceedings* 885: 89-94.

Shao, Z.-G., B.-L. Yi, et al. (2000). "New method for the preparation of the electrodes with very low platinum loading used in proton exchange membrane fuel cell." *Dianhuaxue* 6(3): 317-323.

Teliska, M., V. S. Murthi, et al. (2003). *In-Situ Determination of O(H) Adsorption on Pt and Pt based Alloy Electrodes using X-ray Absorption Spectroscopy.* Fundamental Understanding of Electrode Processes, Proc.-Electrochem. Soc, Pennington, N.J.

Teliska, M., V. S. Murthi, et al. (2005). "Correlation of Water Activation, Surface Properties, and Oxygen Reduction Reactivity of Supported Pt-M/C Bimetallic Electrocatalysts using XAS." *J. Electrochem. Soc.* 152: A2159.

Tsumura, N., S. Hitomi, et al. (2003). "Development of Ultra-Low Pt—Ru Binary Alloy Catalyst Loading Gas Diffusion Electrode for PEFC." *GS News Technical Report* 62(1): 21-25.

Uchida, M., Y. Fukuoka, et al. (1998). "Improved preparation process of very-low-platinum-loading electrodes for polymer electrolyte fuel cells." *J. Electrochem. Soc.* 145(11): 3708-3713.

Wilson, M. S. and S. Gottesfeld (1992). J. App. Electrochem. 22: 1.

Wilson, M. S. and S. Gottesfeld (1992). "High performance catalyzed membranes of ultra-low platinum loadings for polymer electrolyte fuel cells." *J. Electrochem Soc.* 139(2): L28-L30.

Xiong, L. and A. Manthiram (2005). "High performance membrane-electrode assemblies with ultra-low Pt loading for proton exchange membrane fuel cells." *Electrochimica Acta* 50(16-17): 3200-3204.

Yamafuku, T., K. Totsuka, et al. (2004). "Optimization of polymer electrolyte distribution of ultra-low platinum loading electrode for PEFC." *GS News Technical Report* 63(1): 23-27.

What is claimed is:

1. A multifunctional material comprising the general structural formula:

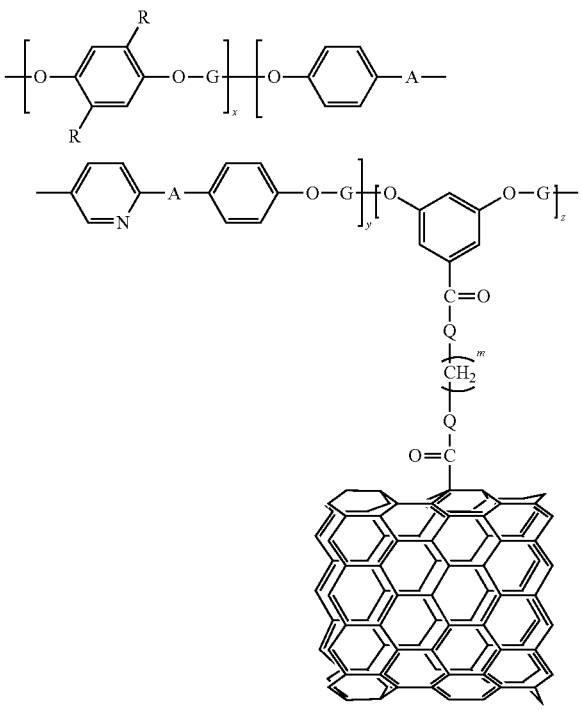

wherein R is selected from the group consisting of:

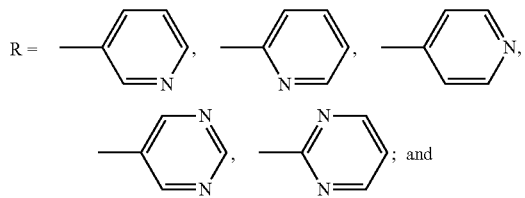

G can be the same or different and is selected from the group consisting of:

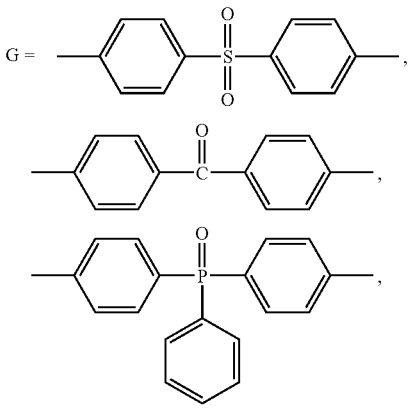

-continued

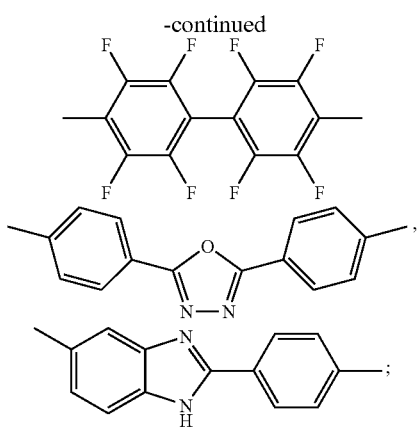

and

A is selected from the group consisting of:
A=—CH$_2$, —CF$_2$, -phenyl, none; or a salt thereof; and
Q is NH or O; m is a number between 1 to 18; and z is a number between 0.01 to 0.25.

2. A multifunctional material comprising the general structural formula:

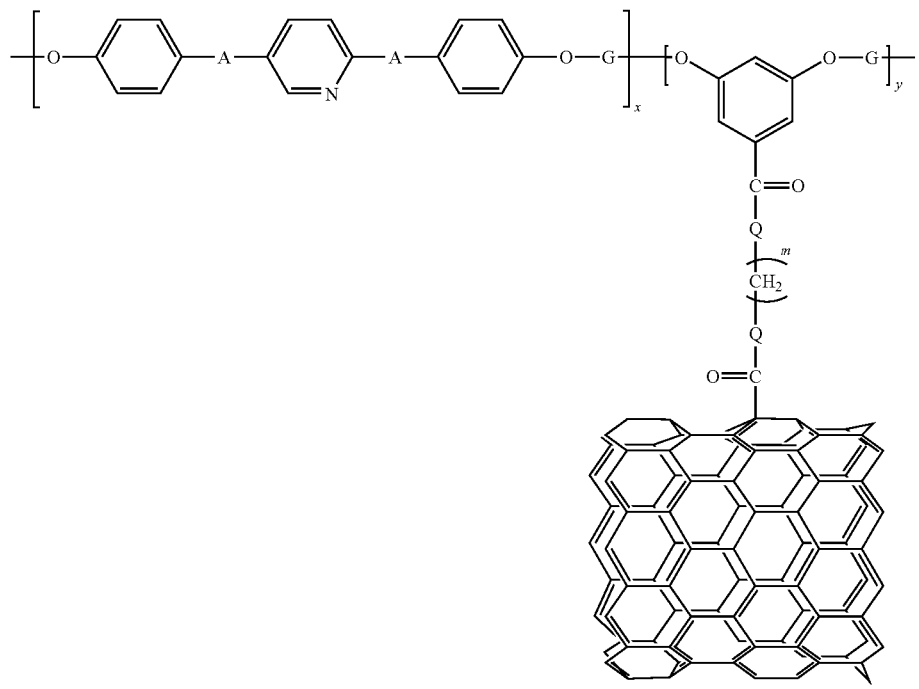

wherein

G can be the same or different and is selected from the group consisting of:

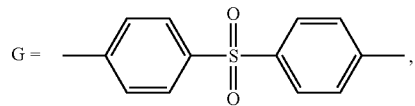

-continued

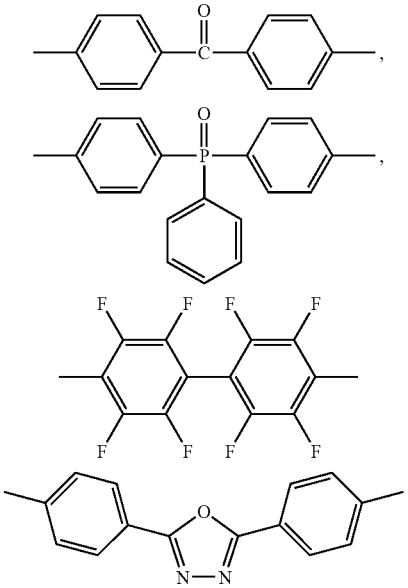

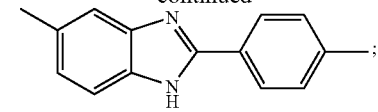

and

A is selected from the group consisting of:
A=—CH$_2$, —CF$_2$, -phenyl, none; or a salt thereof; and
Q is NH or O; m is a number between 1 to 18; and y is a number between 0.01 to 0.25.

3. A process for preparing the multifunctional material of claim 1 wherein the process comprises polycondensation of the monomers at high temperature under conditions such that said multifunctional material is formed.

4. A process for preparing the multifunctional material of claim 1 wherein the process comprises reacting a pyridine or pyrimidine based diols, single wall or multi wall carbon nanotubes modified diols and various aromatic difluorides under conditions such that said multifunctional material is formed.

5. The process of claim 4, wherein the various aromatic difluorides are bis-(4-fluorophenyl)sulfone, bis-(4-fluorophenyl)phenylphosphine oxide, 4,4'-difluorobenzophenone, decafluorobipheynyl, 2,5-bis(4-fluorophenyl)-1,3,4-oxadiazole, or 5-fluoro-2-(4-fluorophenyl)-1H-benzo[d]imidazole.

6. The material of claim 1 wherein the polymer or copolymer backbone is a block copolymer, random copolymer, periodic copolymer and/or alternating polymer.

7. A composition comprising a slurry mixture of a polar aprotic solvent and at least one of the multifunctional material of claim 1, the multifunctional material of claim 2, or a blend of the multifunctional materials of claims 1 and 2.

8. A method of preparing a catalyst, the method comprising:
(a) depositing a layer of multifunctional material of claim 7 by calendaring, screen printing or spraying on a hydrophobic layer; and
(b) drying and sintering the layer deposited in step (a), thereby preparing the catalyst.

9. A layered membrane electrode assembly, comprising:
a substrate layer;
a gas diffusion layer; and
a reaction layer comprises at least one of the multifunctional material of claim 1, the multifunctional material of claim 2, or a blend of the multifunctional materials of claims 1 and 2.

10. A process for preparing the multifunctional material of claim 2 wherein the process comprises polycondensation of the monomers at high temperature under conditions such that said multifunctional material is formed.

11. A process for preparing the multifunctional material of claim 10 wherein the process comprises reacting a pyridine or pyrimidine based diols, single wall or multi wall carbon nanotubes modified diols and various aromatic difluorides under conditions such that said multifunctional material is formed.

12. A process for preparing the multifunctional material of claim 2 wherein the process comprises reacting a pyridine or pyrimidine based diols, single wall or multi wall carbon nanotubes modified diols and various aromatic difluorides under conditions such that said multifunctional material is formed.

13. The process of claim 12, wherein the various aromatic difluorides are bis-(4-fluorophenyl)sulfone, bis-(4-fluorophenyl)phenylphosphine oxide, 4,4'-difluorobenzophenone, decafluorobipheynyl, 2,5-bis(4-fluorophenyl)-1,3,4-oxadiazole, or 5-fluoro-2-(4-fluorophenyl)-1H-benzo[d]imidazole.

14. The material of claim 2, wherein the polymer or copolymer backbone is a block copolymer, random copolymer, periodic copolymer and/or alternating polymer.

\* \* \* \* \*